(12) United States Patent
Salonen et al.

(10) Patent No.: US 7,391,854 B2
(45) Date of Patent: Jun. 24, 2008

(54) METHOD, SYSTEM AND COMPUTER PROGRAM PRODUCT FOR ONLINE CHARGING IN A COMMUNICATIONS NETWORK

(75) Inventors: Matti Salonen, Espoo (FI); Antti Romppanen, Kerava (FI)

(73) Assignee: Comptel Corporation, Helsinki (FI)

( * ) Notice: Subject to any disclaimer, the term of this patent is extended or adjusted under 35 U.S.C. 154(b) by 0 days.

(21) Appl. No.: 10/572,388

(22) PCT Filed: Sep. 20, 2004

(86) PCT No.: PCT/FI2004/000552

§ 371 (c)(1),
(2), (4) Date: Jul. 20, 2006

(87) PCT Pub. No.: WO2005/027409

PCT Pub. Date: Mar. 24, 2005

(65) Prior Publication Data

US 2007/0041532 A1   Feb. 22, 2007

(30) Foreign Application Priority Data

Sep. 18, 2003 (EP) .................................. 03396087

(51) Int. Cl.
*H04M 15/00* (2006.01)
*G06F 17/60* (2006.01)

(52) U.S. Cl. ................. 379/114.2; 379/115.01; 379/121.1; 370/352; 705/7; 705/26

(58) Field of Classification Search ............ 379/114.01, 379/114.03, 114.05, 114.06, 114.08, 114.1, 379/114.12, 114.17, 114.2, 115.01, 121.01; 705/7, 26, 37, 80; 370/352
See application file for complete search history.

(56) References Cited

U.S. PATENT DOCUMENTS

| 6,760,916 B2 * | 7/2004 | Holtz et al. ............... 725/34 |
| 2001/0023181 A1 | 9/2001 | Savolainen |
| 2001/0054115 A1 * | 12/2001 | Ferguson et al. ............ 709/248 |
| 2002/0053078 A1 * | 5/2002 | Holtz et al. ............... 725/14 |
| 2002/0082881 A1 * | 6/2002 | Price et al. ..................... 705/7 |

FOREIGN PATENT DOCUMENTS

| WO | WO 00/24161 | * | 4/2000 |
| WO | WO-00/24161 A1 | | 4/2000 |
| WO | WO-03/042885 A2 | | 5/2003 |

OTHER PUBLICATIONS

ETSI TS 129 198-12 V4.0.0, XX, XX, Jun. 2001, pp. 1-46, XP002219712, Section 5.1 to section 8.4.

* cited by examiner

*Primary Examiner*—Binh K. Tieu
(74) *Attorney, Agent, or Firm*—Birch, Stewart, Kolasch & Birch, LLP

(57) ABSTRACT

The invention is intended to create a online charging method for an end user session comprising at least one first charging session and at least one second charging session. The invention is based on using a combination pricing plan as response to a number of different charging requests, and determining the charging by said combination pricing plan, by using during the end user session different proxy components to identify service requests according to different service identification request rules, each proxy component using individual service identification rules.

45 Claims, 12 Drawing Sheets

Figure 1:
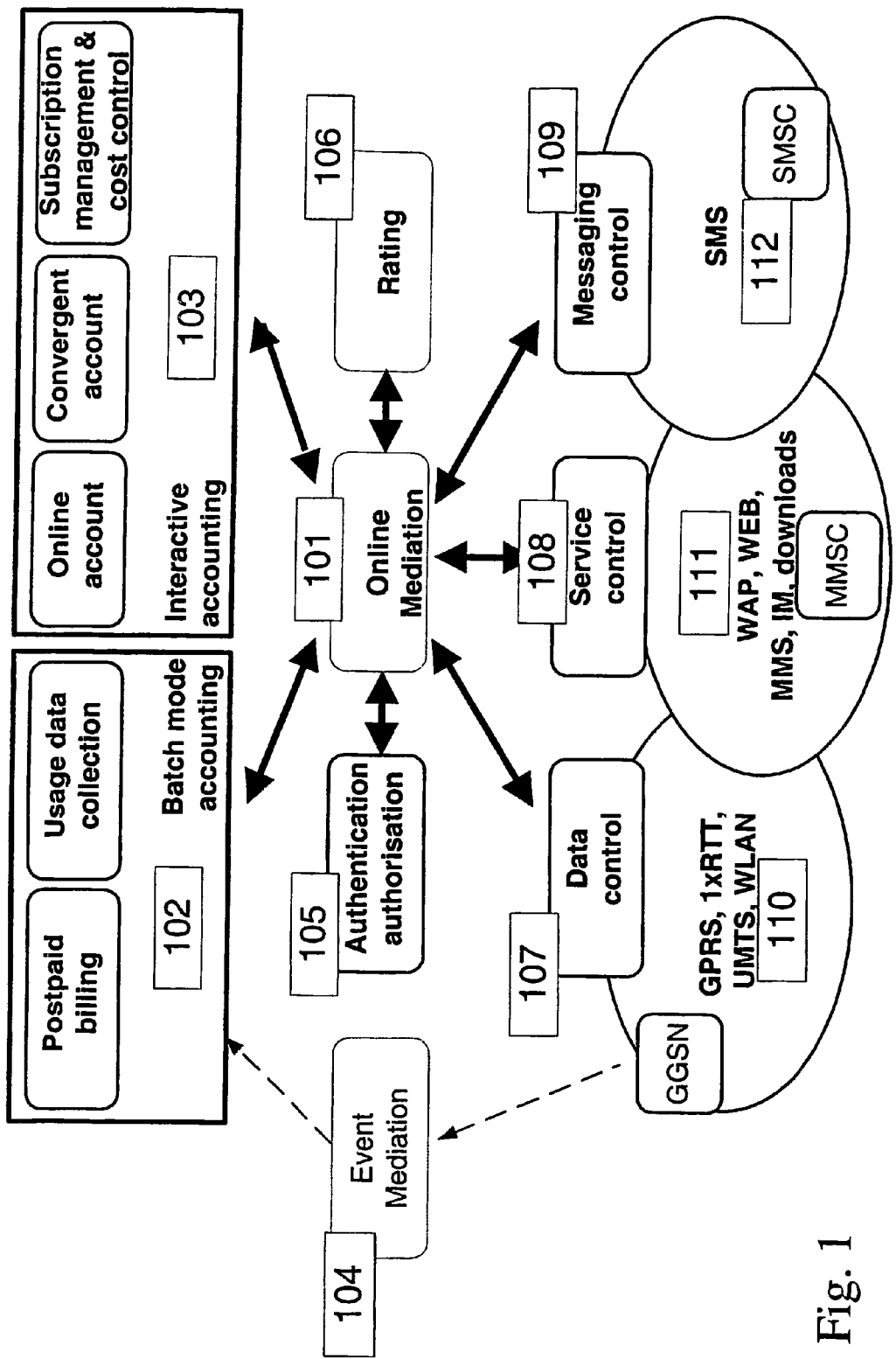

METHOD, SYSTEM AND COMPUTER PROGRAM PRODUCT FOR ONLINE CHARGING IN A COMMUNICATIONS NETWORK

Methods of this kind are used, for example for charging the non-voice services of prepaid customers, coordinating charging for a multimedia session between a mobile terminal and a remote host on both an application/media level and on an IP/access bearer level, and for minimizing credit losses caused by subscribers, while at the same time maintaining good performance of the system.

The traditional IN-based Prepaid Systems have been designed for charging the voice calls of prepaid customers. Already today prepaid subscribers form the majority of the total worldwide customer base and they want to be able to use the same services as the postpaid users. Until now, the lack of open, real-time charging solution has been slowing down the service deployment in prepaid environment.

Patent publication WO 02/37870 discloses one mechanism for coordinating charging for a multimedia session between a mobile terminal and a remote host on both an application/media level and on an IP/access bearer level. A token associated with the multimedia session is generated and used to correlate session charges for operations performed in the packet-switched access network and for operations performed in the multimedia system. Although the actual charging, and especially controlling the availability of services among the user session, is not described in the publication. Actually, the publication describes how to correlate different kind of events together in multimedia environment. These functions have been done equivalently for many years in conventional networks such as GSM networks.

Patent publication WO 02/67156 describes another method for control of billing in a communications network. The objective is to accomplish a mechanism for minimizing credit losses caused by subscribers, while at the same time maintaining good performance of the system. A gateway receives service requests and filters out the requests for which the analysis performed indicates that a credit loss risk is involved. For these service requests an in-advance credit check is initiated. If the credit check indicates that the delivery is permissible, a reservation is made for the amount of money corresponding to the service price, i.e. the said sum is reserved in the subscriber account so that said sum cannot be used by another service request in the meantime. When the service has been delivered successfully, the reservation is confirmed and the said sum is debited from the balance of the subscriber account. Otherwise, the reservation is cancelled. This publication concentrates to check the credit of subscriber and reserving money from the account of the subscriber when needed.

Drawbacks appear in the state of art when faster end user session management, especially charging, is required or desired. Operations requiring faster end user session charging can not be performed and operations desiring faster end user charging are performed inconveniently. An example of operations that require faster end user session charging is online service offered to an unknown client. An example of operation that is performed inconveniently is practical necessity to give one's credit card number to unreliable host for charging Internet purchases.

The present invention relates to mediation and precisely mediation in online environment. Furthermore the invention teaches very effective and interactive way to charge and control access and services provided by operators and services providers.

Mediation is a process wherein usage data is collected from telecommunication network and delivered to operator's Operation and Business Support System (OSS/BSS). Mediation software collects usage data from network by interfacing various different network elements. This traditional mediation is divided in two main categories, namely real-time mediation and batch mode mediation. Characterizing to these mediation types a flow of events made by subscribers and end users, called mediation process, is mainly unidirectional from network elements to OSS/BSS systems. In traditional mediation types there are generally no or few interaction between the network layer and OSS/BSS layer. Also any charging models and their variations and even provisioning new charging models to system are not presented in any known prior art publications, which are told in this document.

Online mediation provides operators and service providers very flexible tools for charging and controlling data, messaging and service usage. As a significant advantage, it enables a real convergent mediation with both post-paid and prepaid charging models. The concept of the invention fits especially for all non-voice services, however not limiting to them.

It has been often recognised that in most countries the average revenue per user (ARPU) is lower for prepaid than for post-paid customers. There are many reasons behind this, but the single most important one seems to be quite straightforward: there are simply more services and pricing models available for post-paid customers.

This is especially evident with non-voice services, such as GPRS, WAP and MMS. These services are expected to increase the average revenue per user in the coming years. However, many operators are facing serious challenges when offering these services for their prepaid customer base.

Current network infrastructure and prepaid systems have certain restrictions in terms of non-voice charging. For instance, legacy prepaid systems were designed only for voice charging. And by default, non-voice network elements do not include pre-delivery control required in the prepaid charging.

The invention is intended to create an online charging method for an end user session comprising at least one first charging session and at least one second charging session.

Practical target of the present invention is to create an interactive online mediation method, system and computer program product for charging and controlling sessions online made by subscribers and end users. The target is achieved for example by identifying the requests from different types of networks and combining them under a charging rule cache mechanism. The charging rule cache is associated with an end user session. Charging transactions corresponding to a certain charging session are synchronised so that versatile charging models can be offered. These can include for example pure volume or pure event based charging for all the services and accesses. According to the present invention, there is also provided a computer program product for running an online mediation system, which computer program product comprises computer program means for controlling the operation of the online mediation core component and the network layer control components.

A product based on the invention, Comptel Online Mediation, was built to meet the emerging challenge of performing true prepaid charging for non-voice services. It enables operator to unify the non-voice service offering and charging models for pre- and post-paid customers. The present invention enables an open and generic charging infrastructure, which supports virtually all access and service networks as well as different payment systems (OSS/BSS).

The invention is based on using a combination pricing plan as response to a number of different charging requests, and determining the charging by said combination pricing plan, by using during the end user session different proxy components to identify service requests according to different service identification request rules, each proxy component using individual service identification rules.

Considerable advantages are gained with aid of the invention. Operators can provide versatile charging models, end users can be informed of the actual cost of service purchase and credit losses can be controlled. Chargeable online service can be offered to an unknown client. It is not practically necessary to give credit card number to unreliable host for charging Internet purchases.

Arrangements for managing end user session online charging are presented. Furthermore, present invention gives actual solution how subscribers can be charged and served with an online mediation system. This is an inventive step in comparison to the two publications, mentioned earlier, where it is told generally the environment of the field of technology, but not the actual solution how subscribers are going to be charged and served with any real online mediation system.

In a preferred embodiment of the invention online charging is performed in a system independent online mediation system. A preferred embodiment of the invention is related to the charging of non-voice services. However it is not restricted to this area and can be used to charge for any type of networks and services. It aims to provide a complete set of charging models and capabilities. These are obtained by combining and managing access, media and service level charging under a pricing plan mechanism which enables the changing of charging rules within an active charging session. Furthermore the invention enables the provisioning of service identification rules to the network layer control nodes or proxy applications.

A preferred embodiment of the present invention makes it possible to construct a reliable online mediation system and method with effective control of services and fraud prevention. The inventive concept allows also several useful and advantageous embodiments, which provide further advantages.

For a more complete understanding of the present invention and the advantages thereof, the invention is now described with the aid of the examples and with reference to the following drawings, in which:

FIG. 1 presents a block diagram of an environment of online mediation system with the network elements and operations and business support systems.

Figure 2:
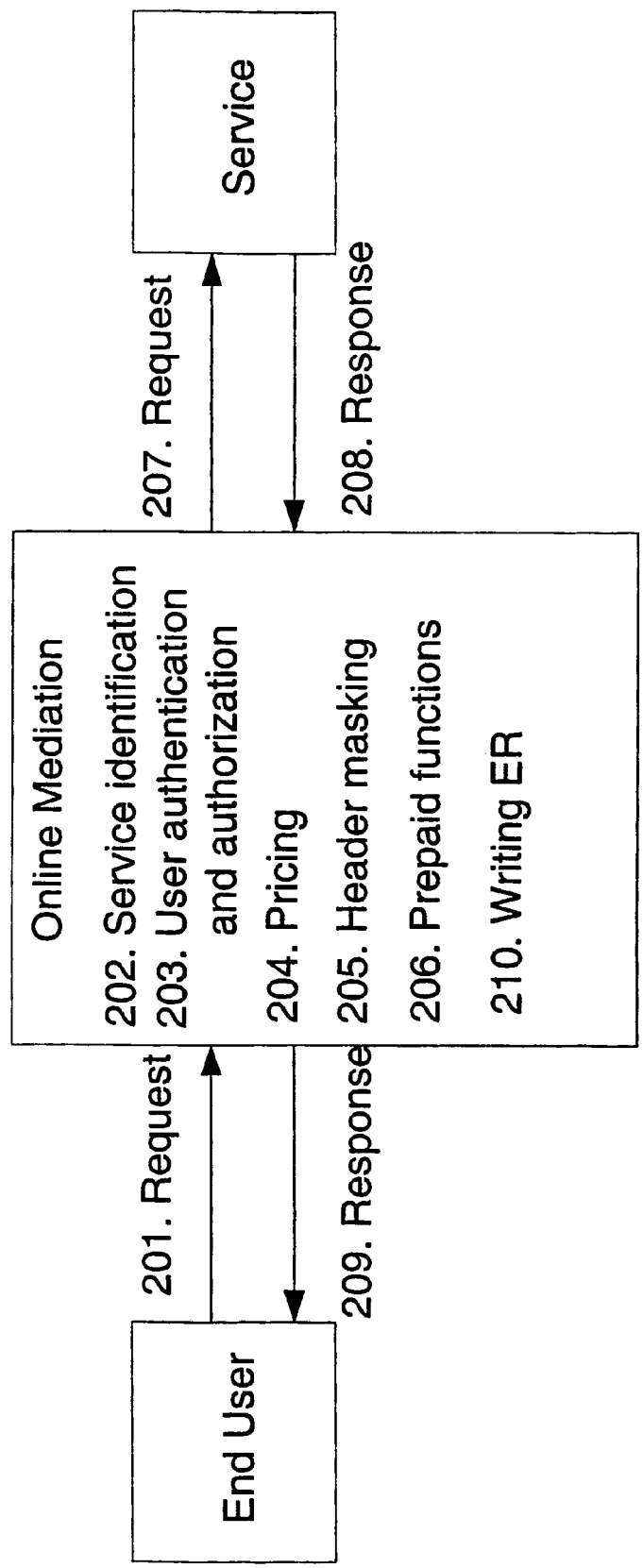

FIG. 2 presents an example of Online Mediation functionality used in the prepaid charging of non-voice services.

Figure 3:
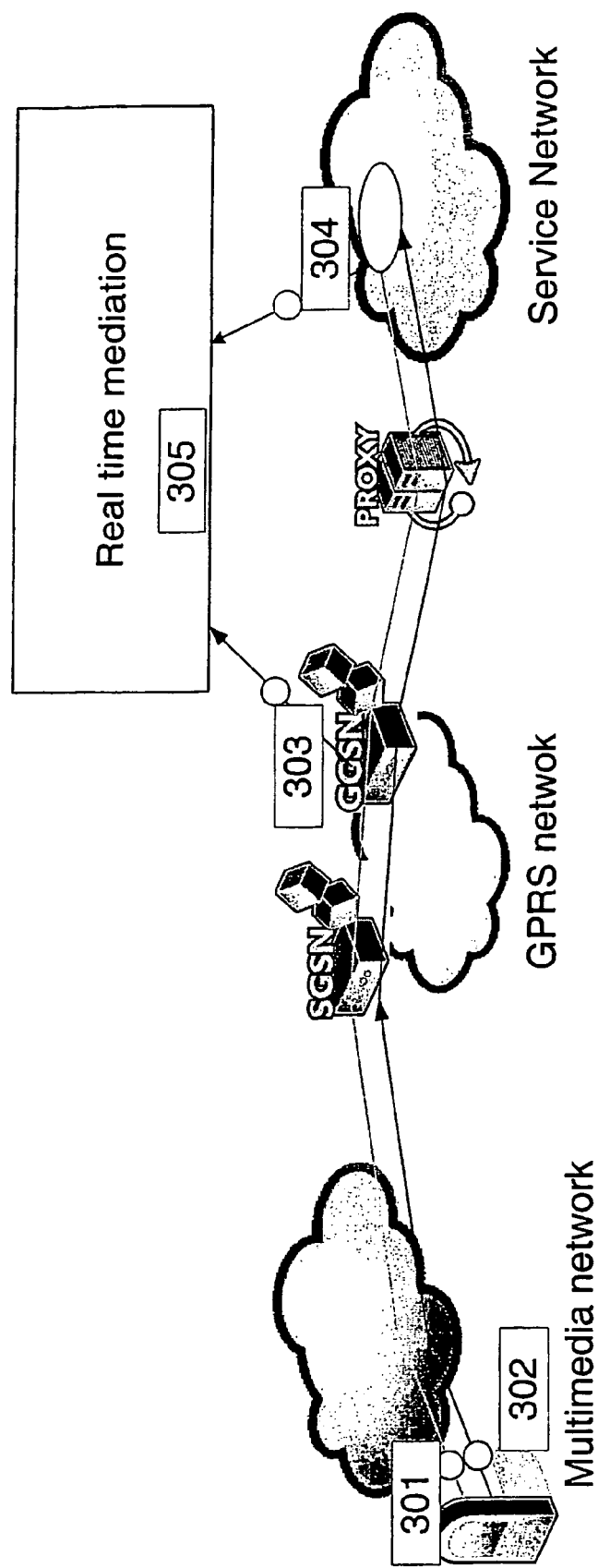

FIG. 3 presents an example of real-time mediation functionality (prior art).

Figure 4:
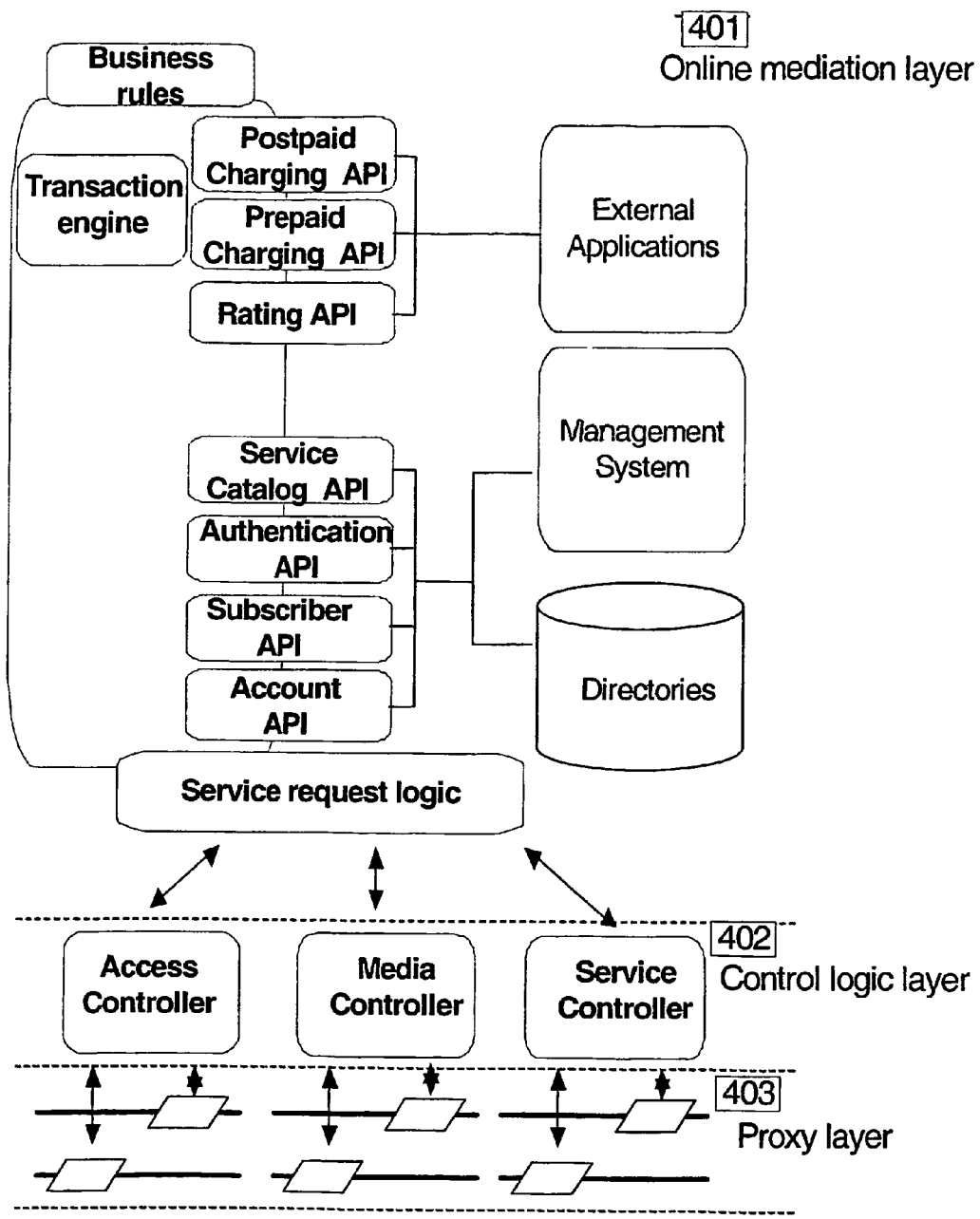

FIG. 4 presents a block diagram of layers connected with the online mediation system in a framework according to an embodiment of the invention.

Figure 5:
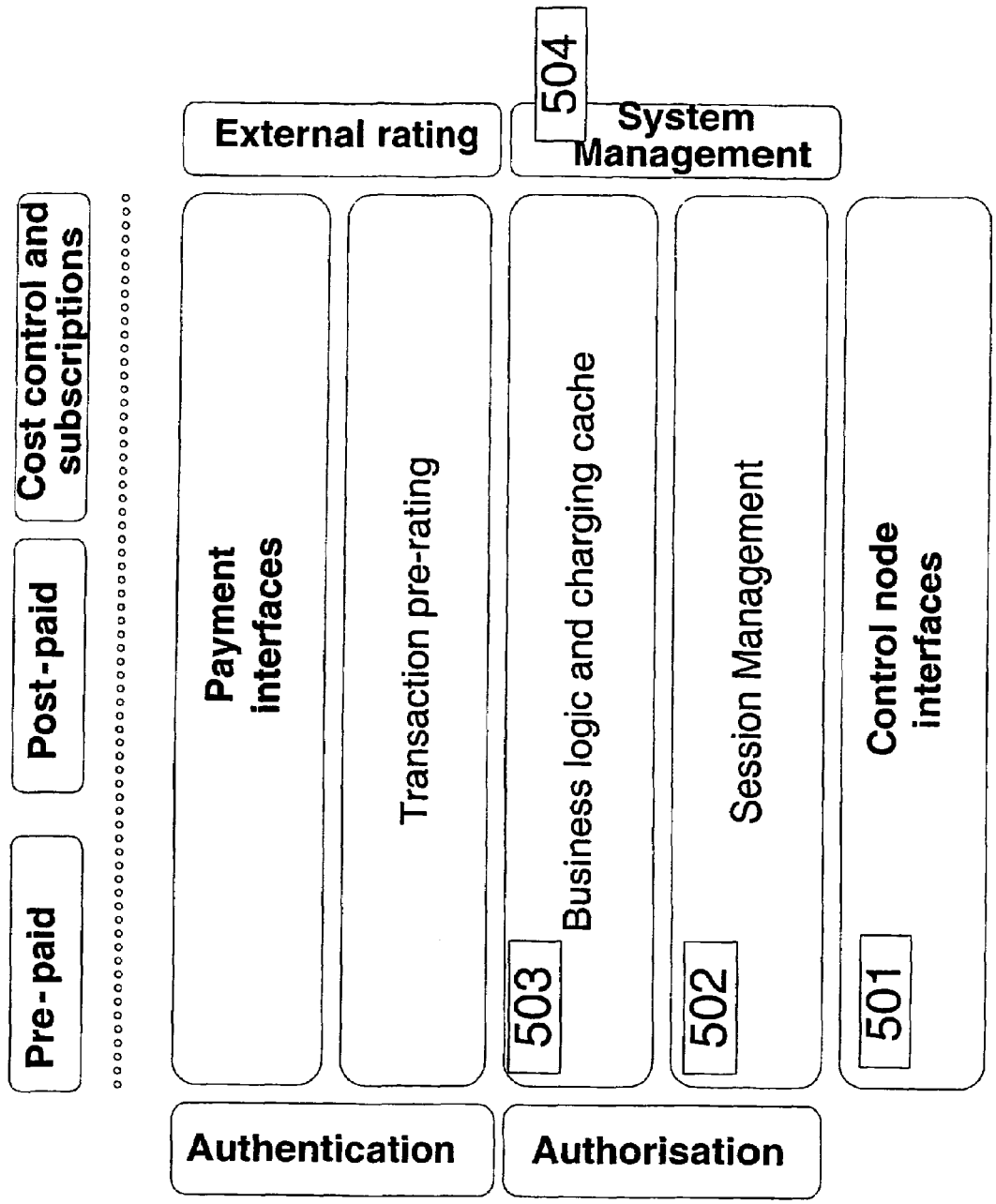

FIG. 5 presents a block diagram of the online mediation layer in more details of a framework according to an embodiment of the invention.

Figure 6:
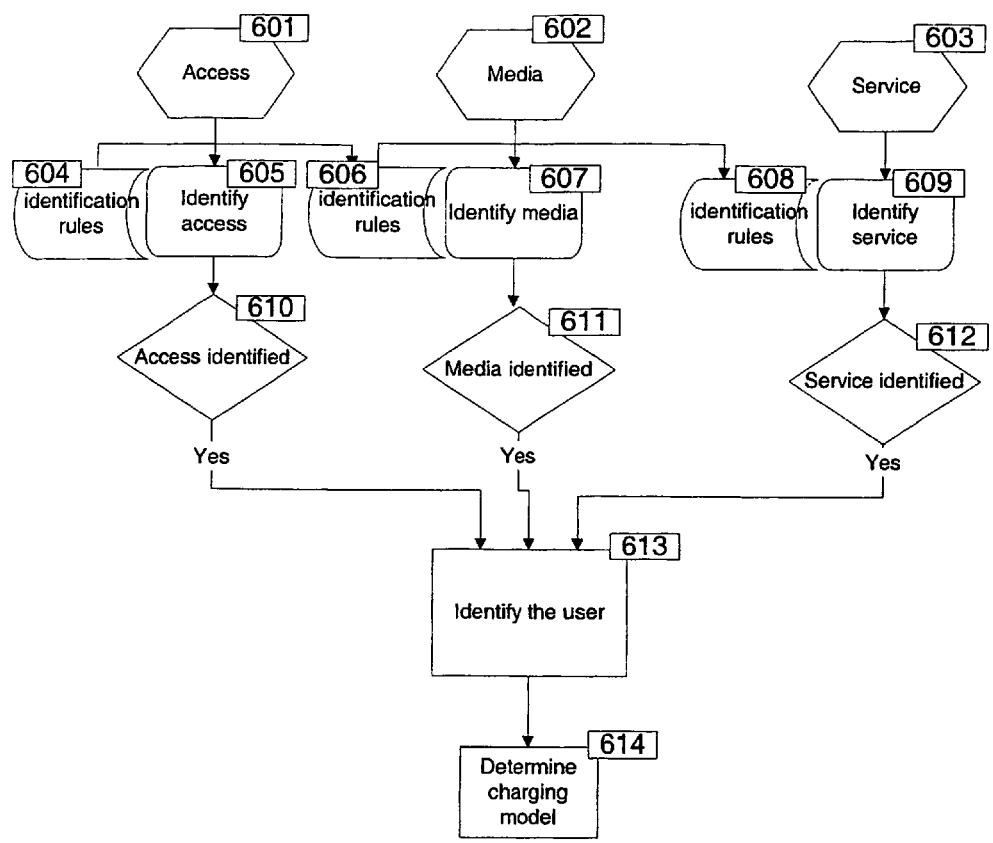

FIG. 6 presents a flow diagram of service request identification according to an embodiment of the invention.

Figure 7:
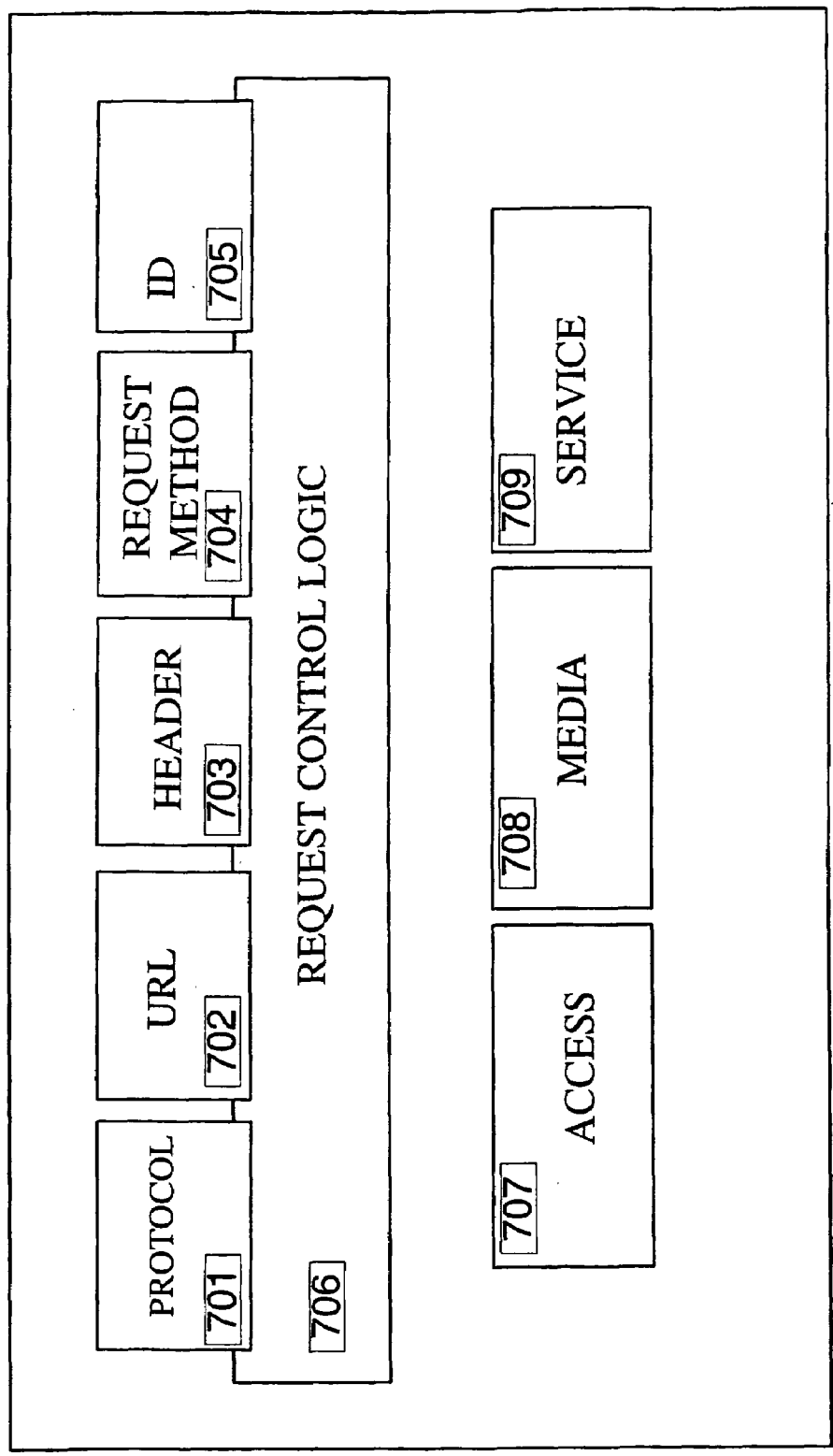

FIG. 7 presents the entities used in service request identification according to an embodiment of the invention.

Figure 8:
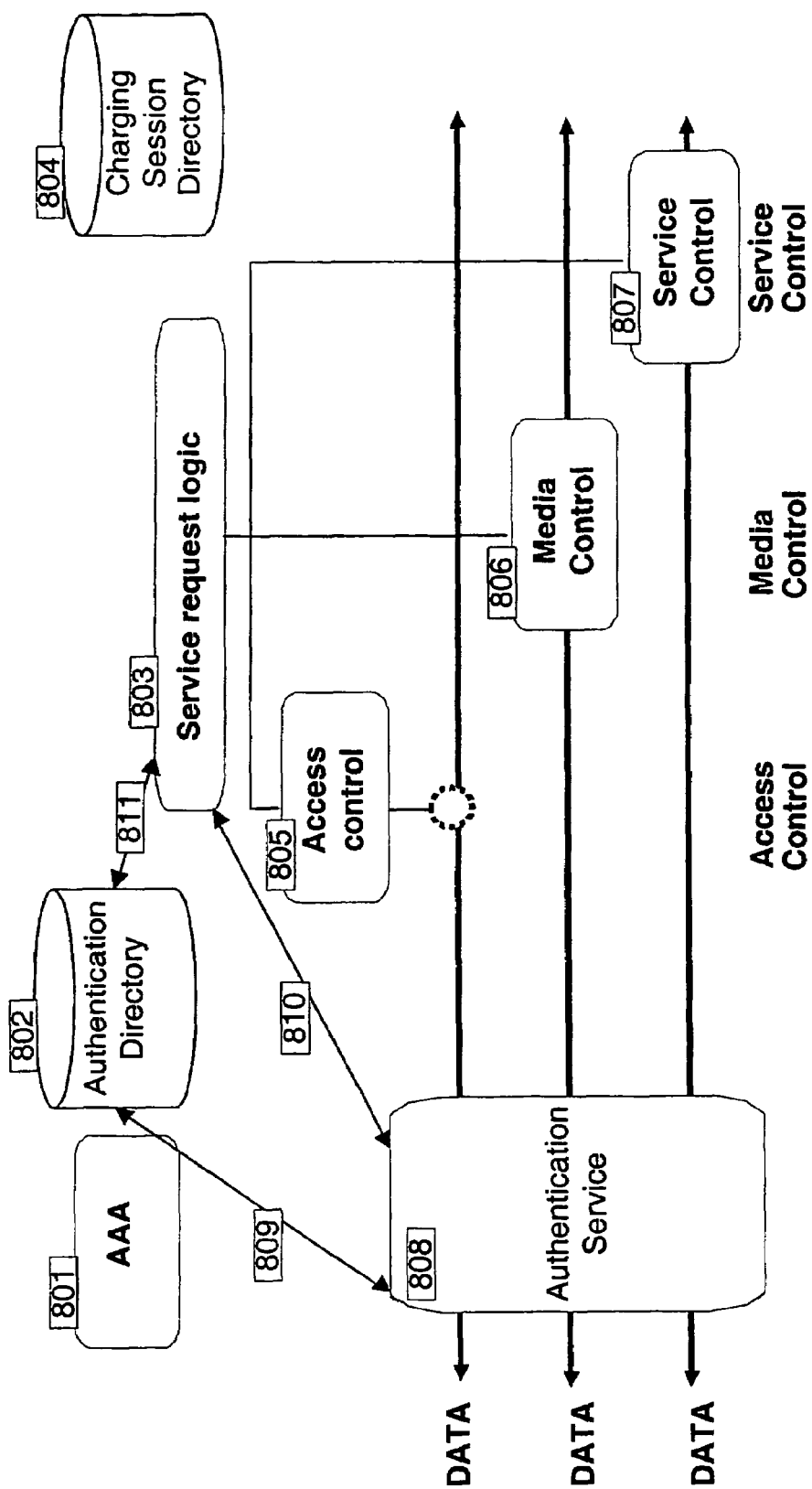

FIG. 8 presents an example of how authentication and session synchronisation can be done.

Figure 9:
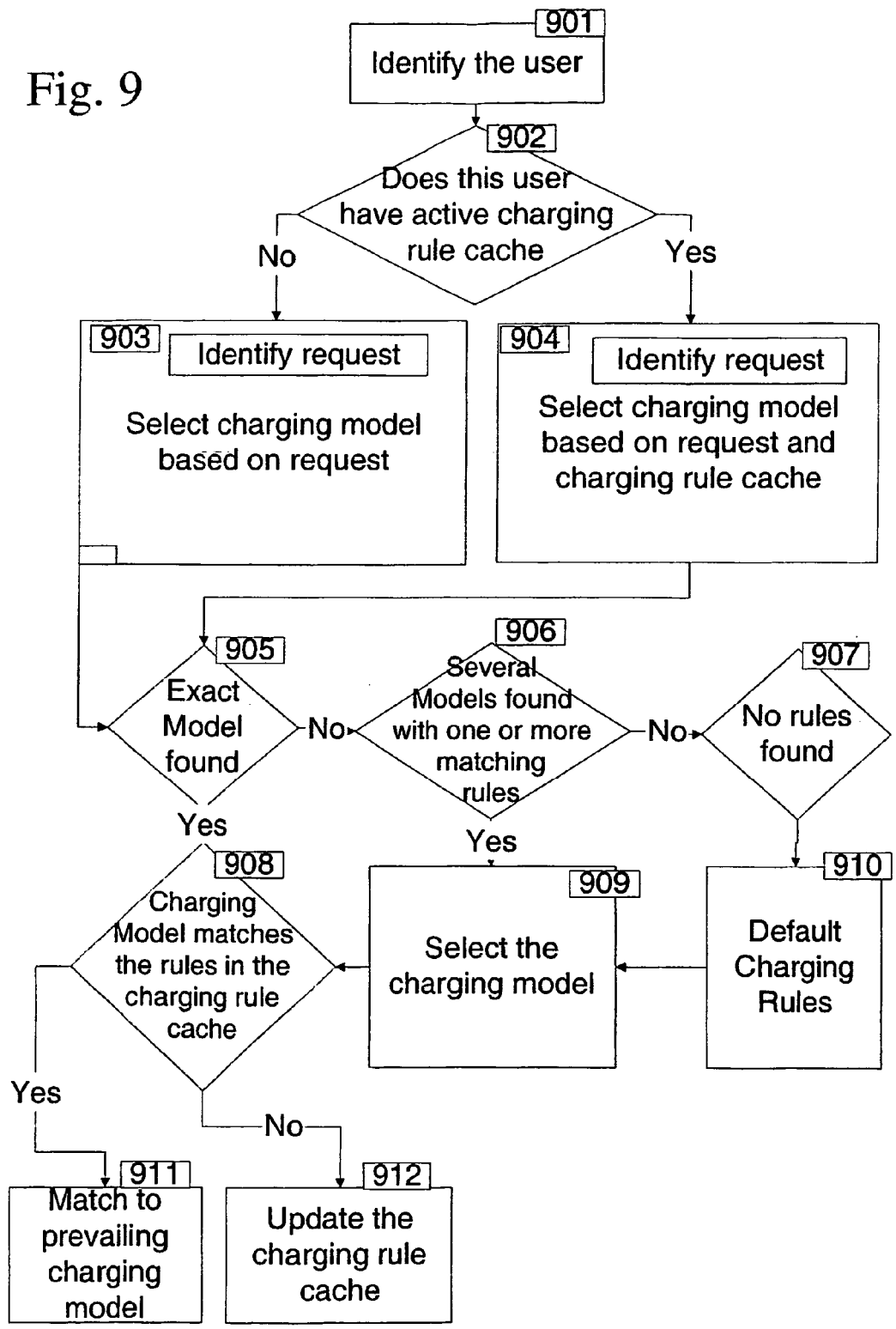

FIG. 9 presents a flow diagram of how a charging model can be selected.

Flow 10 presents a flow diagram of how charging correction procedure work according to an embodiment of the invention.

Figure 11:
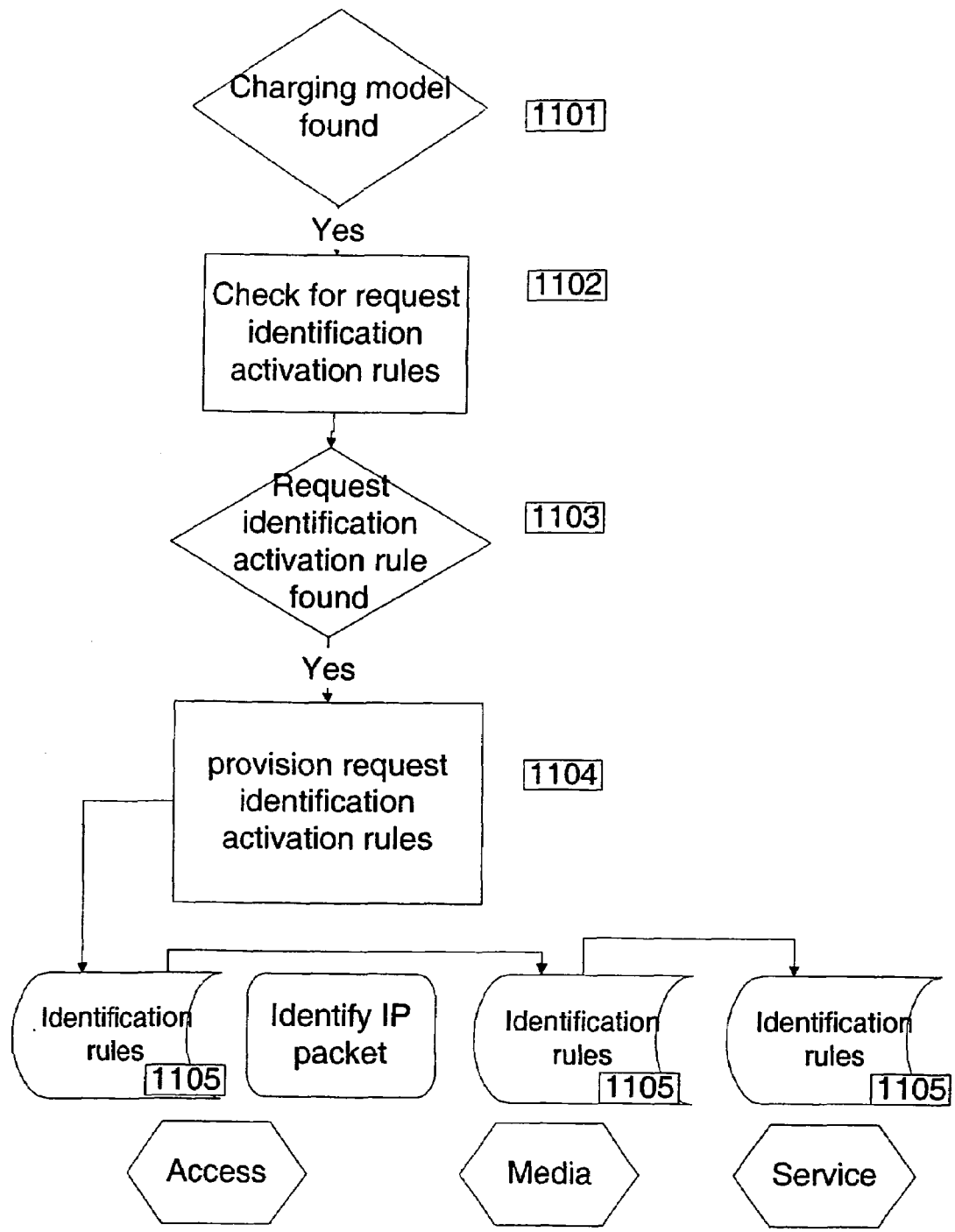

FIG. 11 presents flow diagram identification rule provisioning according to an embodiment of the invention.

Figure 12:
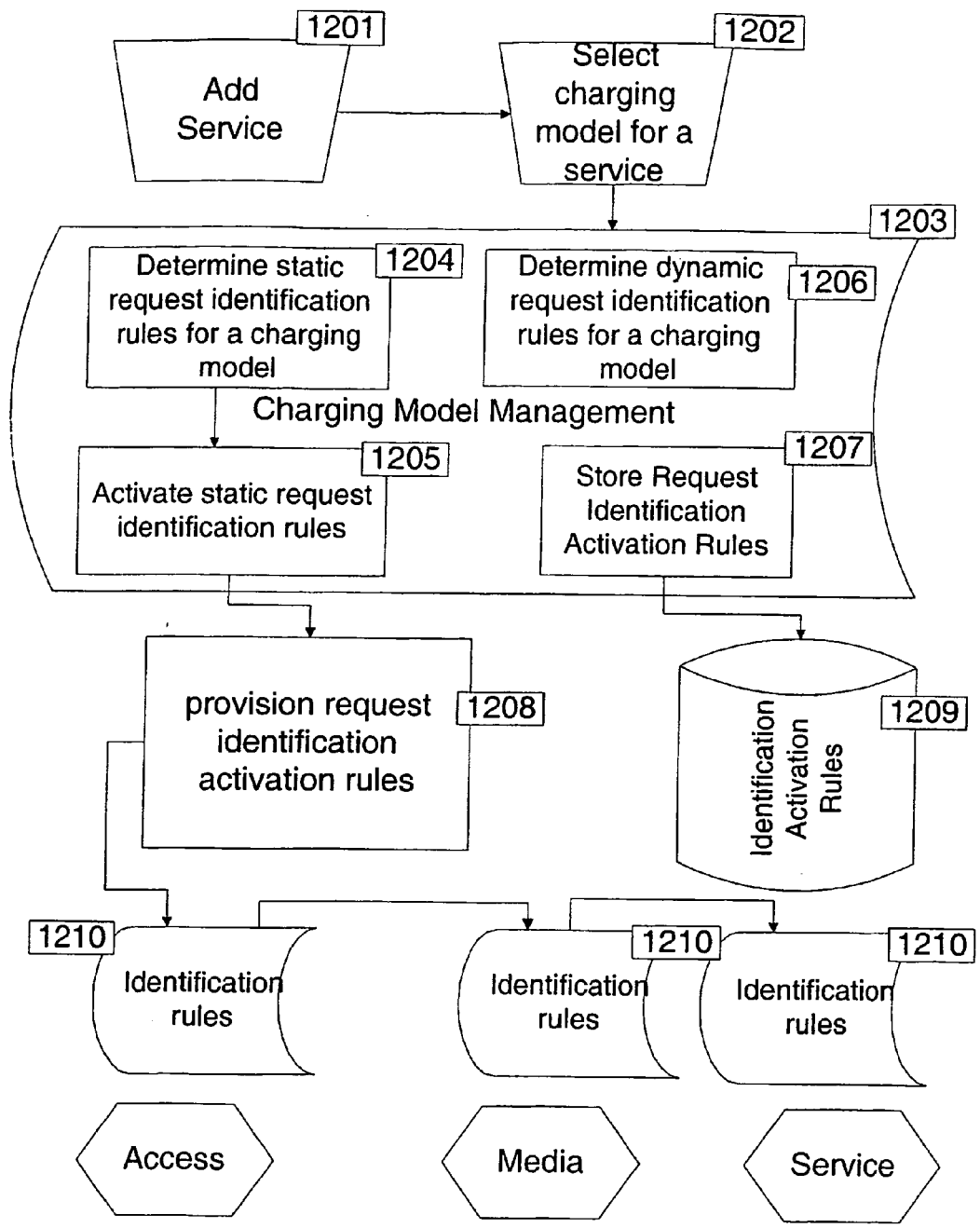

FIG. 12 presents a flow diagram of identification rule management according to an embodiment of the invention.

An Example According to the Environment Picture of FIG. 1

The invented system interfaces to different control nodes to enable online charging and control of resource and service usage (101). The control nodes include Data Control, Service Control and Messaging Control elements.

With reference to FIG. 1 Data control (107) covers access and media related charging. Data Control can be implemented by several solutions. One of these is a proxy component operating on the GPRS backbone (Gn interface). This proxy can handle GPRS access monitoring and control, and also GPRS sessions. An alternative solution is an IP Proxy located outside the GPRS network—either directly after GGSN (Gi interface), or more generally in operator's IP network. IP Proxy, however, does not have access to the GPRS access data and GPRS sessions.

Data control with access monitoring and GPRS session control can also optionally be implemented with an intelligent GGSN, which provides data control and charging for GPRS access. Some SGSN vendors also provide support for CAMEL3 directly from their SGSN. CAMEL3 solutions and intelligent GGSNs generally provide bulk volume based charging, where no protocol-specific charging is possible. However, APN (Access Point Node) differentiated charging is in some cases possible.

Also other control nodes can exist. For example, session control for SIP sessions can be implemented by another node. Also with RADIUS or Diameter protocol it is possible to control user sessions. The system can alternatively act as a RADIUS or Diameter or proxy server for external applications. In this case it acts as the authorising element for the sessions, and possibly also for the service transactions.

Service control (108) can be implemented by intelligent proxy applications that support the charging of any type of HTTP traffic like MMS, browsing and downloads. Chargeable services can be operator's own, provided by 3rd party partner or dedicated services on the public Internet. The invented system provides interfaces for trusted external services to access the service charging and control functions. These services can be for example external content services or charging transactions from external network elements such as WAP GW or MMSC. This requires, however, intelligence from the external service to authorise and report transactions.

Messaging control (109) handles SMS charging and control. Messaging control is performed using SS7 capable components that captures messages, and performs charging and authorisation for the person-to-person, person-to-application and application-to-person messaging in real-time.

An alternative solution for application-to-person or person-to-application message charging and control is to interface directly from an SMS application to the invented system. These trusted applications must contain some intelligence to authorise and report the service transactions.

Additionally to service control nodes the Online Mediation environment usually involves also additional interfaces to different kind of business support systems. These can be different type of directories or data processing applications that are used to query for information or enrich it. With reference to FIG. 1, two different type of business logic support systems are presents as examples:

Authentication and authorisation (105) can either be done in the network layer by controlling nodes or they can be performed by the invented system. In the latter case the system would directly interface to these services.

Authentication is required to identify the user and enable the correct business logic. User authentication may require for example interfacing to an external authentication service, such as a RADIUS or Diameter server.

Once the user is reliably identified, the user profile for charging can be fetched from internal or external database. The user profile defines for example the user subscription method, allowed services and account location.

Service authorisation defines whether the requested action is allowed to proceed. For example, users may have restrictions on certain services due to the nature of the service or content.

Build-in rating capabilities include simple rating rules such as volume rates for certain protocols, and event rates for example an MMS or SMS message. More complex rating models, such as discounts, are provided by external rating (106) component.

The purpose of Online Mediation is usually to provide the means to charge for the service usage in some network (110, 111, 112). Online mediation layer can be associated with Batch mode and Interactive accounting. However, the latter is where the power of online mediation can be utilised.

Batch mode accounting (102) is provided for post-paid subscribes. This includes resource and service control and authorisation and enables for example the blocking of unauthorised services, as well as cost control applications.

Interactive accounting (103) can be provided for both post-paid and prepaid customers. This includes enhanced resource and service control and authorisation and enables for example the blocking of unauthorised services, as well as cost control applications.

Interfacing towards a prepaid account requires interactive accounting. It includes the reservation, deduction based on confirmation as well as the cancelling of a reservation. The usage information can also be used for usage data reporting.

Online Mediation Functionality According to the FIG. 2 Depicts and Example of How an End User Accesses Content Services Through Online Mediation when Using Prepaid Services.

Online Mediation is term used for the interactive connectivity of transactions in the different type of network elements to business applications in various business support system environments. Interactive connectivity enables the inclusion of online mediation functionality within each transaction. It means, for example, that end users can be authorised before they open data sessions or download premium services.

Term online is frequently mixed with descriptions about real time functionality, and more precisely with event mediation (104). Real time means that a transaction in some network elements activates some real time functionality for example in mediation layer at the very same instant as the transaction has occurred. However, real time solutions do not provide any means for intercepting the transactions in the network elements. The transactions will proceed normally and they can only be associated to the activated real time functionality. A more strict definition for real time specifies a guarantee of a time window within which the real time functionality is activated.

The numbers in the FIG. 2 show the order of the sequences within the transaction. First, the end user requests a service (201). Online mediation identifies the requested service and authenticates and authorizes the end user (202). Online mediation uses an external authentication system for the authentication (203).

Next, Online mediation prices the service (204). When a service request is sent to the content server, an identifier can be sent in the service's request header. The original user identifier is supplied by the WAP gateway device, and it can be, for example, the end user's MSISDN. This user identifier can show the end user's identity. If the original user identifier is not wished to be sent to the content server, Online mediation can mask it (205). After masking it is not visible to the content server.

Online mediation can generate a user identifier or obtain one from an external authentication system. This identifier does not show the end user's identity.

When the end user pays through a prepaid account, the balance of the prepaid account is checked. If the prepaid account can be charged, the account value is reduced by the correct value (206).

Next, Online mediation requests (207) the content server to deliver the ordered service to the end user (208 and 209). As the last step of the transaction, Online mediation writes an event record of the transaction (210).

An Example of a Real Time Application is Depicted in the FIG. 3.

It illustrates a typical non-voice service network arrangement where a service request is initiated with a mobile terminal device (301). A request generates one or several token(s) (302) (as described in prior art publication WO 02/37870) that are delivered via different types of channels. One token can be associated with a session between the terminal device (301) and service application (304). Another one can be associated with some particular service request.

It is the nature of real time mediation applications that there are active listeners or probes in the network, constantly monitoring the traffic. In this example, a GGSN node (303) acts as a real time billing mediation probe. All the traffic goes through it and it keeps routing it further to IP network. At the same time, it collects traffic data to a real time mediation device, which can utilise it for billing or reporting purposes. The example also involves another active network element. The service application (304) itself generates log files that can be collected to the mediation device in real time. Both of these network elements (303, 304) continue processing the service requests as they come, the additional data (including the tokens) delivered to mediation layer (305) is yet to be processed and the network element's operation is not linked to this mediation process in any way. This is basically what is meant with real time mediation. It involves the collection of event records from the network in real time and separates the mediation layer processing from the network layer processing.

One should notice that the above-described example includes a very powerful means for pricing a service. The tokens described in the example can be correlated in the mediation layer and it is possible to combine the charging of multiple request channels to a single charging request.

Building Charging Models

The invented system aims to provide operators with flexible tools for charging. Charging model defines how a price is determined for a content service at a specific time, for a specific service and for a specific end user.

Charging model information id separated from the general information of the service and each service can only have one valid pricing model at a time.

Charging Model Building Blocks

Price Source Location:

There are at least five different price source locations. These are: service request, content service, pre-paid system, internal database and external rating engine. The original price information is fetched from these locations. However the unit type and unit size, which are used to specify the price values, are always specified in the internal database.

Price Types:

There are at least four different price types. These are: free of charge, item based, time based and volume based. Content specified with a 'free of charge' price type is not charged, but an event record is still created for audit trail purposes. 'Item based' means that each incoming content request is charged as a full entity. 'Time based' or 'volume based' price types are meant for streaming content. Here the unit type and unit size play an important role. For example a price for a video clip could be specified as 2€ per second or it could be 3 €per 100 kilobytes. Different price types can be created according to the capability of control node applications.

Tariff Class:

Tariff class is a place for a price. One tariff class can be associated to several content. I.e. when adding new content to the system, the operator user selects the desired tariff class for the content. The price for the tariff class is specified earlier through the Management System.

Tariff classes are specified in the internal database. The price values related to a tariff class can reside in the internal database or they can be fetched using an external rating engine. Therefore tariff class definition overrides price source locations: content request, content service. Tariff classes and Price types can co-exist. Therefore tariff class definitions must also contain unit type and unit size definitions.

Price History and Change Management:

The prices for different content tend to change. In many countries the law defines that the user must know the price information. Therefore also the time when the price changes must be a specific time.

Price history and change management covers this type of functionality. There shall be a possibility to define a validity period (dates and time values) for 1 . . . n price values in the internal database and only one price value can be active at a time.

Price history and change management is valid only for price source location: internal database.

Calculation Rules:

Simple rating functionalities are called calculation rules. These include for example the calculation of the number of MMS message recipients or calculating the total price of volume based price type with 1€ per minute unit type and three minute download time.

Examples of Charging Models

Item Based:

Item based charging means that the service request is mapped to a one-time price through tariff class mechanism. No additional rules are needed to define the final price.

Item Based with Calculation Rules:

This means that the service request is mapped to a one-time price through tariff class mechanism. In addition to this the pricing model defines the rules that are used to calculate the total price.

An example of this is sending an MMS message to multiple recipients. The price defined through the tariff class is per message recipient. The calculation rule is: count the number of recipients from message headers and multiply the item price with that.

Volume Based, Basic Calculation Rule:

In this model the price is defined per measurement unit (e.g. kilobytes) through the tariff class. The calculation rule is simple: Multiply the volume of the request with the price.

HTTP POST request includes the message size in Content Length header field and it is defined as kilobytes.

HTTP GET request is more complicated, because the content length of the request message does not include the requested content size. If the payment reservation is required, we need to get the content length before the requested content is delivered to the end user. We have the following options to perform this:

Omit the payment reservation step, forward the request to the content server, receive the response, calculate the total price from the content length—parameter and make the payment deduction from the prepaid account. If the deduction failed, the content is not delivered to the end-user.

Make an additional HTTP HEAD request (with the header fields from original message) to the content server. The response to this message includes the real content length. So the total price can be calculated and payment reservation step can be performed.

Volume Based, Complex Calculation Rule:

Otherwise this is the same than the previous model, but the calculation rule is more complex. The price can be defined through steps, e.g.:

0 to 100 kilobytes=0.01 Eur/kilobyte
100 to 500 kilobytes=0.02 Eur/kilobyte
500 to 1000 kilobytes=0.03 Eur/kilobyte
over 1000 kilobytes=0.04 Eur/kilobyte It is recommended, that the external rating used is used in this case.

Subscription Based Charging Model:

When the service is subscription based, the payment for the service is made in advance. We need an external subscription service system to check the subscription validity. The subscription can be based on time (validity period, is checked) or number of usage (Subscription includes a usage counter that is deducted by one for each request. When the counter is zero, the subscription is not valid any more).

When the service requested is identified as subscription based, no payment reservation or deduction steps are performed. Instead of these Check subscription validity—operations are performed towards the external subscription system. If the response is OK the normal delivery steps are performed.

Combination of Subscription Based and Item/Volume Based:

This charging model means, that first the subscription validity is checked against the external subscription system and if response is OK the steps for item/volume based pricing are done and payment reservation/deduction steps are performed when needed.

Subscription Based Charging Model:

Subscriber based pricing is always performed by the external rating system. The rating request includes MSISDN and Service Id as parameters. The rating system calculates the price according to the predefined rules and returns the total price to system e.g. e- or m-commerce platform. It is assumed that the e- or m-commerce platform and Rating system uses the same currency.

Session and Charging Rule Management:

Session and charging rule management handles the user charging session data management, as well as the charging rule selection. User charging session is opened for example when the user creates a GPRS session. The charging session opening results in an initial balance reservation to authorise the session creation.

All charging transactions inside this session are synchronised so that also complicated charging models can be realised. The synchronisation is performed by the business logic and charging model synchronisation layer. When a charging transaction takes place, the session management transfers the transaction to the business logic, and the business logic processes the transaction. The business logic returns an updated charging rule in the charging rule cache, or alternatively advises the session layer to release the end user session (and also instruct the control nodes to disconnect the user).

With pure event charges from external platforms, where access or media related charges are not necessarily related—a charging session can be opened, and closed immediately as soon as the event delivery is confirmed by the control node.

Online Mediation Device According to the FIG. 4

In an embodiment of the invention (FIG. 4), wherein the system has several functional layers, the online mediation system provides an adaptable online charging interface layer towards Proxy layer (403), which includes different type of control nodes or proxy applications. The control components (402) recognise the chargeable data and service flows in different networks and technologies and trigger charging events for the online mediation core (401) to process.

As is apparent from the above disclosure, the present invention can be applied in a great variety of applications requiring reliable charging and controlling of subscribers in various communication networks and technologies.

Online Mediation Layering According to the FIG. 5

With reference to FIG. 5, Online Mediation consists of different layers of functionality. This invention is associated mainly with Control node interfaces (501), Session management (502), Business logic and charging rule cache (503) functionality as well as System Management (504).

The invented system operates by accepting charging requests from the controlling nodes in real-time. The communication between system and control nodes is interactive, providing a request-response method of communicating. Control nodes request permission and authorisation for a transaction from the system. The request can be for example following:

Request permission for certain access volume with certain service type

Request permission for certain message or download transaction

The control nodes perform the initial traffic classification into service types, and perform elementary data aggregation. This helps to reduce the traffic required between the control nodes and the system In addition to the above-mentioned requests, the information received from control nodes can be also for example a notification that the user is now roaming.

Control node interfaces layer (501) hides the different control nodes from the Online Mediation core (502 and 503). It provides the different protocol adaptations between the different control nodes, and the internal representation of charging transactions. A common API internally represents all charging transactions from different controlling nodes.

Session and charging rule management (502) handles the user charging session data management, as well as the charging rule activation. User charging session is opened for example when the user creates a GPRS session. The charging session opening results in an initial balance reservation to authorise the session creation.

All charging transactions inside this session are synchronised so that also complicated charging models can be realised. The synchronisation is performed by the business logic and charging model synchronisation layer. When a charging transaction takes place, the session management transfers the transaction to the business logic, and the business logic processes the transaction. The business logic returns an updated charging rule cache to the session layer, or alternatively advices the session layer to release the user session (and also instruct the control nodes to disconnect the user).

With pure event charges from external platforms, where access or media related charges are not necessarily related—a charging session can be opened, and closed immediately as soon as the event delivery is confirmed by the control node.

Business logic and charging model synchronization (503) enables for example pure event-based charging for MMS and content. When a user downloads an MMS message or a Java game, the charging requests related to the access and service usage are synchronised. The access usage related to the service transaction is zero-rated, and the event charge is allocated for the transaction. The charging rule cache management makes it possible to synchronise the charging requests from different control nodes.

The Charging Model Principles Include the Following Aspects:

Which of the charging components the operator want to use (access/media/service) for charging What kind of charging model the operator wants to use within each component (subscription based/volume based/time based/event based/combination of previous models)

Which component is responsible for charging of which services

Does the charging of the service in one component affect to the charging in other component Definitions Online mediation: Online Mediation term is used for the interactive connectivity of transactions in different type of network elements to business applications in various business support system environments. Interactive connectivity enables pre-delivery charging functionality. It means end users can be authorised before they can for example open data sessions or download premium services. Fraud-free prepaid charging is probably the most evident example of pre-delivery functionality of online mediation. In online mediation environment the network elements and payment systems have interaction between each other's.

Traditional mediation (both real time and batch mode): Mediation is a flow of events made by subscribers and end users. The mediation process, either real time or batch mode, is mainly unidirectional from network elements to OSS/BSS systems. In traditional mediation types there are generally no or few interaction between the network layer and OSS/BSS layer and therefore e.g. pre-delivery function is not implementable.

End user session: A session within the system that associates an end user to some resources. This can include several types of service usage sessions.

Service usage session: General term for the service usage event experienced by the end user. This can include several types of charging sessions. Within one service usage session there can be several similar and/or different charging sessions connected with each other's.

Charging session: A session related to one proxy application. Charging session is a common description on event information made by ends users. Charging sessions contain various kind of information such as identification of end users, start and stop times of service, pricing information, etc. Examples: access session, service session, media session.

Access session: A session related to access proxy application.

Media session: A session related to media proxy application.

Service session: A session related to a service proxy application.

Charging request: Charging request is the embodiment of a charging model. It is the actual request made towards a charging service such as a prepaid or postpaid account.

Charging model: Charging model defines how end user is charged for the service usage. Charging model can be a simple item based model or it may include several charging rules related to duration, volume etc.

Charging rule: Charging model consists of charging rules and their combinations. Examples of charging rules are item based or volume based.

Charging rule cache: Charging rule cache includes the charging rules that represent the identified charging model. Charging request is build according to the rules in charging rule cache.

Smart proxy: A proxy application that is able to identify service request according to some rules that have been provisioned to it.

DETAILED DESCRIPTION OF THE INVENTION

From end user's point of view the invention is experienced in an accurate pricing model for service requests. The end user requests some service from a content server that locates behind the system functionality. More precisely, the system interfaces to one or more proxy application or service control components that hide the content servers from the end user. FIGS. 6 and 7 depict the service request identification within the proxy layer.

Service Request Identification

Proxy applications examine the received service request according to service identification rules that has been provisioned to them according to description with reference to FIGS. 11 and 12 If the end user's service request matches the service identification rules in any of the proxy components, an end user session is initiated within the system.

Service Request Identification According to the FIG. 6

FIG. 6 depicts the steps for identifying a service request and how an end user session is initialise within the invented system. It should be noted that service request is understood as a combination of different type network requests invoked by an end users service request. For this reason the invented system can utilise different type of proxy components for different functional areas.

Access level request identification relates to examining the IP packets that flow to or from the content server. Media level request identification refers to opening a service session such as GPRS or WAP connection. From now on term service usage session is used whenever referred to session that a user experiences when requesting for a service.

Term end user session is used when referring to the session within the described system. With service level request identification it is understood that services are identified in application level. For example a service request is identified based on specific URL.

Service Request Identification Entities According to the FIG. 7

With reference to FIG. 7 request identification can be based on attributes found in the functional areas of access (707), media (708) or service (709). The attributes can be related to protocol (701), URL (702), Header information (703), request methods (704) or other identifiers (705). These are called Service Request Identification Entities. Request control logic (706) is able to parse and match any type of entities that are included in the service requests. Request identification rules can include one or several entities and/or any type of combination of them.

Again with reference to FIG. 6 request identification can be done in one or several proxy components as well as in the request control logic within the invented system. What this means is that a service request by an end user may include several different type of network level service requests that need to be identified. The actual implementation and request identification locations depend on the deployment environment in the sense of what types of proxy applications are available. In case the proxy application is a smart gadget and it is able to identify request very accurately, only minimal request identification information will be sent within the interface message. This could be some keyword or id number that is linked to charging model identification rules within the system. On the other hand, if the proxy application is simple the interface message will include detailed information about the service request. In this case the system will try to identify the request according to procedure described in FIG. 7.

It is also possible that there is need to further narrow down the service identification done by a smart proxy. In this case the service identification is also done according to procedure described in FIG. 6. It should be noted that the smart proxy scenario is more desirable in terms of performance since processing is done close to the information source and only adequate data is delivered to the system.

With reference to the flow chart presentation of service request identification in FIG. 6 the identification procedure begins with the identification of a single service request from different type of network services (601, 602, 603). The first service request can be initiated from any of these network service areas. Steps 605, 607 and 609 describe that each network service area has its own service identification procedure. This can be located in proxy components or alternatively within the core of the invented system. Items 604, 606 and 608 represent the request identification rules. These relate to the FIG. 7. Request identification rules are formed of the Request Identification Entities. Also, FIGS. 11 and 12 illustrate more accurately the provisioning of service identification rules and how the rules in proxy application are linked to different charging models. Once one of the service requests (601, 602, 603) is identified the system begins to identify the end user (step 613). This includes the checking of whether the end user has an active end user session. If such is found the end user session information is used for the upcoming steps. After the user is identified, the system starts determining a correct charging model for the service (step 614).

User Authentication and Service Charging Session Synchronisation

With reference to the FIG. 6 (step 613), the system needs to identify the end user that is requesting for a service. It may also be required that the user needs to be authenticated and authorised. FIG. 8 is a schematic presentation of and example how the authentication can be done.

An Example of Authentication and Session Synchronisation According to the FIG. 8

With reference to FIG. 8 the end user can be authenticated with several different kind of network configurations. In many cases the end users are authenticated with some centralised authentication service (808). With reference to step 809 end users authentication may include RADIUS connection to an AAA server (801), which generates a reference directory (802) with for example user's IP addressing and end user session. This is preferred procedure especially if all the proxy applications can utilise the same service. In this case the proxy components (805, 806, 807) will deliver the IP addressing details to service request logic component (803). This component can further connect (811) to the AAA directory for verifying that the end user is authenticated.

An option for the above-described arrangement is that the service request logic component (803) itself includes authentication specific functionalities. This would mean that it could itself send authentication dialogs or for example certificated queries to the end user. This could be done either directly to authentication service (810) or via proxy applications (805, 806, 807).

Charging sessions need to be synchronized (804) in order to charge according to preferred charging models. The synchronisation means that the service request logic (803) is able to identify which service request from different proxy applications (805, 806, 807) belong to the same service usage session. In case of centralised authentication service, this is a straightforward task. Each service charging session is checked for authentication information. If the referred id (for example IP address) is marked as authenticated the service charging session is associated with that end user session.

In case there is no separate authentication service, the system itself must include authentication functionality (808) in order to support the charging session synchronisation.

Charging Model Selection

With reference the flow chart presentation in FIG. 9, a mechanism of charging model selection is presented. Request identification presented in FIG. 6 described how it aims to identifying a user (613) and how the charging model is determined (614). These steps overlap with some steps in this presentation. Actually, the flow chart in FIG. 9 describes in more detail, how the charging model selection is done.

Charging Model Selection According to the FIG. 9

When the system has identified a user (901) and the service request from one of the proxies (601, 602, 603), the system starts to identify correct charging model for the service request.

With reference to the steps in FIG. 9 the systems checks whether the end user has an active charging rule cache or not (902). If such is found, the system will examine the prevailing charging rules and use this information when trying to update the charging model in upcoming steps. During the step 904 the system will finalise the request identification. As described before the request identification can be done already in some proxy application and request identification in this level merely means that request is mapped to some category.

If the system fails to find an active charging rule (903), the system will anticipated that it will try to match a charging model based only on the request. Both paths (903 and 904) lead to charging model matching steps (905, 906, 907). One Charging Model can consist of multiple charging requests from different proxy applications. The prevailing principle is that the system constantly tries to identify the closest matching charging model for the charging requests associated with a service usage session. If the system finds an exact match (905), it continues to check the charging rule cache (908). However, if the system finds several candidates for charging model (906), if follows predefined rules in order to choose the closest matching model (909). If no rules are found (907), the system will use default charging rules (910) and select the charging model accordingly (909).

Next, the system will check the charging rule cache (908). All the charging rules associated with this particular end user session and service request need to be inline the matched charging model. If the cache is already in order (911), the system state will remain the same. However, if some rules are missing or some rules are no longer needed, the system will update the charging rule cache (912).

Charging models are defined in the system beforehand. FIG. 12 depicts a procedure for managing the charging rules and models.

Charging Model Correction

As described earlier with reference to FIG. 9, the charging of service requests in online environment can sometimes lead to marginal charging errors. This is because the charging requests from different proxy or control node applications may be received at different moments of time. On of the principles of online charging in these situations is that it always charges a service request based on the prevailing charging model in the charging rule cache. The cache is updated based on the newly incoming requests associated to the same service usage event.

Figure 10:
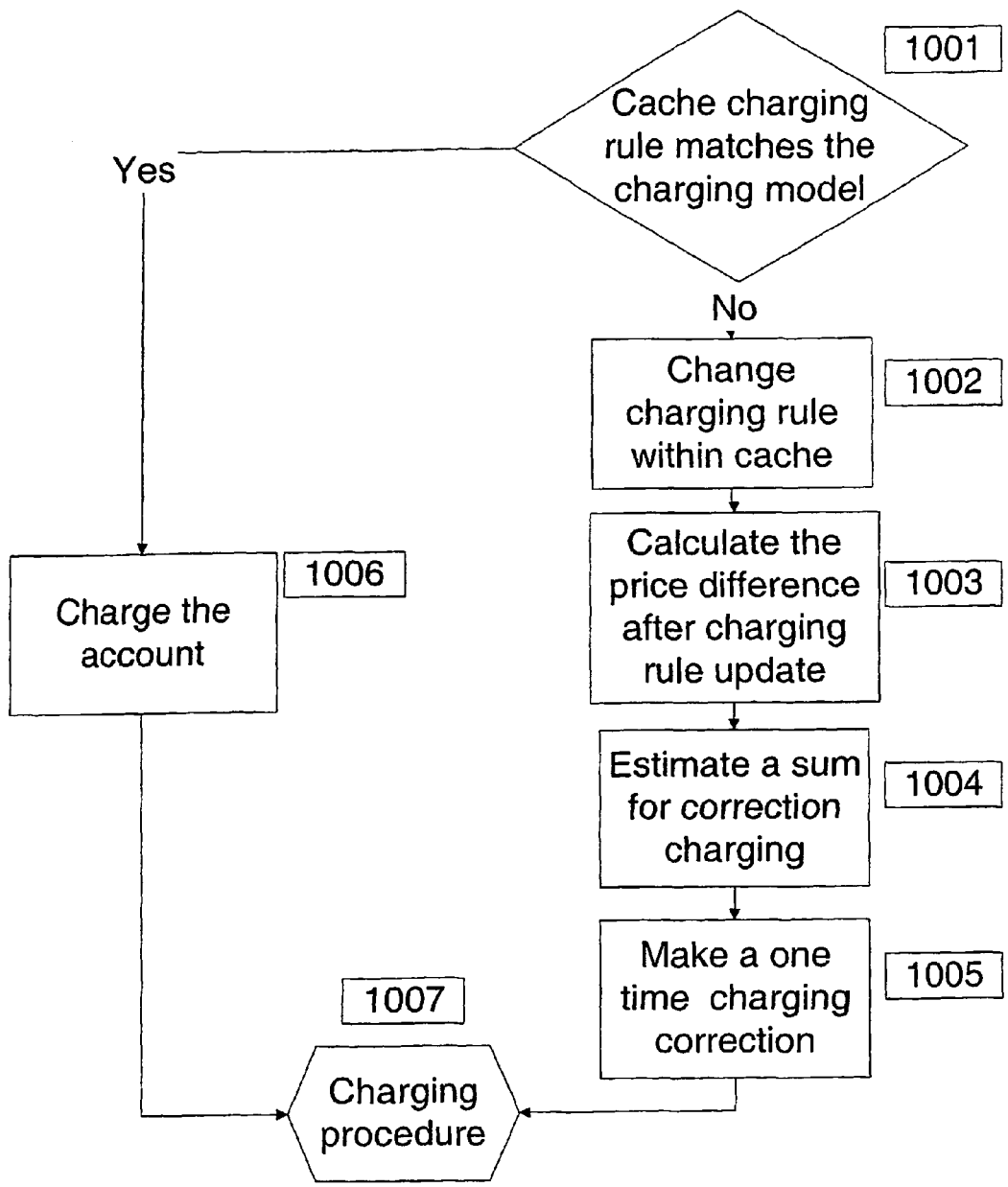

In Order to Execute a One Time Charging Correction Each Time the Charging Rule Cache is Update (1001) a Charging Model Correction Mechanism is Introduced According the Flow Chart Presentation in FIG. 10.

Each time the system notices that it must update the charging rule cache (1002), the system calculates (1003) a price difference related to this charging rule update and the previous charging rule. There are different types of basis for this calculation. It can be based on time and information of the likelihood of previous charging model being incomplete. The calculation may not be very exact and therefore some estimation may be needed (1004). Once the system has determined the amount of charging correction, it will execute a one time charging correction (1005).

In case there is no need to update the charging rule cache, the system will charge the account (1006) according to normal charging procedure (1007), which is also the end point of the correction procedure path.

Example of Charging Rule Handling

Following chapters describe an example of how online mediation can be used for building pricing models. The description refers to FIGS. 6 and 9.

Whenever the system has identified a charging model for a charging request it also checks whether the charging rule cache includes all necessary charging rules in order to support the charging model (908). This can be illustrated with an example.

If the system includes a charging model that states that a service request is charged item based plus there is an extra cost for the data volume, we need to build this type of charging model piece by piece. This is because the charging information originates from different sources namely different control nodes or proxy applications.

Item based charging information is obtained from service proxy (603) and volume information is obtained from access (601) proxy. The information flow within these two are not synchronised and therefore we need some means to combine them in order to comply with the defined charging model. The system may receive the first charging request either from the access proxy or from the service proxy. Let's assume that the first charging request comes from the access proxy. The fact that the invented system receives a charging request from the access proxy means that the proxy hasn't been provisioned service identification rules that restrict it from sending data based charging information. The invented system receives the charging request from the proxy application and tries to match a charging model for it (614). The system notices that it can belong to several different charging models. Information is missing since some of the charging models suggest that access charging may be combined to some specific service request. The system selects a charging model that deals only with access charging or a model that is a combination of access and some service. The choice depends on how these are defined. Based on the selected charging model, the system initiates a charging rule cache session where a charging rule is defined (912). The cache session may also include information whether the charging model is complete or not.

Charging rule cache allocates a configured amount of monetary units in order to charge the access according to the one charging rule that is defined. Later on, the system will receive another charging request. This time it comes from the service proxy side (603). Again, the system tries to match a charging model (614) for the service and this time there is a perfect match for the service request identification rule. The match is a pricing model that combines item based and volume pricing. Now the system tries to find an active charging rule cache session for this particular end user. If such is found (as it is the case in this example) the system will update the charging rule within the charging rule cache (912) so that it corresponds the charging model. Now the updated charging rule can utilise the already allocated monetary balance in order to charge for the service according to the current charging model.

It should be noted that it is possible that the system has already charged a portion of the allocated charging rule cache according to the previous charging rule. This is ok and it reflects the nature of online functionality. The system should not wait forever for the charging model to be complete but more likely to charge according to prevailing charging rules. Whenever a new charging request updates the charging rules within the charging rule cache, the charging changes. However, with different time configurations and charging rule cache allocation it is possible to impact to the likelihood of charging precisely according to the charging model.

FIG. 11 Depicts the Handling of Service Identification Rule Provisioning.

Identification Rule Provisioning

Runtime provisioning functionality also relates to supporting different pricing models. In the previous example it was described how charging rule cache and charging rules can be utilised for building charging models where we combine for example item and volume based pricing. More often it is needed that one or several of the proxy applications is configured not to send charging information to the system.

Whenever the invented system has matched a charging model for a service request (1101.), the system will also check if this particular charging model contains some request identification activation rules (1102).

If the charging model includes (1103) service request identification activation rules, the invented system will provision (1104) them to the correct locations (1105).

Service rule activation provisioning includes some challenges. The activation would most preferably be done for some specific end user and for some specific service session. This makes this very difficult. For example, access proxy would need to identify the end user and specific content service in order to omit the volume based charging information to be sent to the system. In some cases, such as when the access proxy is not able to identify the content service, this is not possible.

Service Management Provisioning

Service management is term for managing the lifecycle operations of service related data such as pricing plans, service profiles etc. The lifecycle operations include add, search, remove, modify and display functions.

Identification Rule Management According to the FIG. 12

When adding new services (1201) to the system, there already exist some configurations of charging models. Chapter Building charging models describe the different type of charging models in more detail. Within the system these charging models are supported by mechanisms so in that sense it is possible to support many other charging models as well. However, for these presented and ready to choose from charging models the source and type of charging information is known and well defined. They involve definitions of certain proxy components and service identification rules.

When the administrator user adds a new service (1201) to the system, he selects a pricing plan (1202) for it. A pricing plan defines how the content service is priced and charged. It includes the charging model and price information for the charging model entities. For example, if the pricing model combines volume and time based pricing the pricing plan will enable the actor to enter price information for both of these charging model entities. Charging Model Management (1203) functionalities first checks the selected charging model. If the charging model includes static request identification rules (1204), they are activated (1205). Activation is done by provisioning (1208) the rules to system database, request identification cache and relevant proxy applications (1210).

There also exist dynamic request identification rules. These rules are not provisioned straight to the proxy applications but they are activated upon a service request. If the Charging Model Management notices that the selected charging model includes dynamic request identification rules (1206) it stores (1207) these rules to database and request identification cache (1209).

The invention claimed is:

1. Method for managing online charging in communications networks, the method comprising:
   receiving at least one first charging request relating to a service of at least one first charging session in a first network element,
   receiving at least one second charging request relating to a service of at least one charging session in at least one second network element, and
   setting charging model for the first and second charging sessions, characterized by following steps performed online during an end user session comprising at least one first charging session and at least one second charging session,
   identifying a common user of the at least one first charging session, and the at least one second charging session,
   determining the authorization of the user to the services during the end user session, and for authorized users
   using at least one combination pricing plan for setting charging for the end user session,
   using the combination pricing plan as response to the first and the second received charging requests,
   determining the charging by said combination pricing plan, the charging being different from the charge determined by the first charging request(s) and the second charging request(s) added together, and
   determining being carried through by using during the end user session different proxy components to identify service requests according to different service identification request rules, each proxy component using individual service identification rules, and
including a method for creating charging model in communications network, comprising the steps of
   receiving at least one charging request from the network layer including a subscriber identifier, information of whether the user has been authenticated or not, a service identifier referring either access data, service session or a piece of content service, and checking whether the system includes a pricing plan for the received charging request(s).

2. A method according to claim 1, characterized by including a step of checking whether the system withholds an active charging session for the end user in question.

3. A method according to claim 1, characterized by including a step of creating a charging session for combining at least two charging requests under a single pricing plan.

4. A method according to claim 3, characterized by the step of creating and maintaining charging session further comprising at least one of the steps of reserving a configurable amount of monetary units for charging according to charging rules, and withholding a charging rule and updating it according to pricing plan definitions.

5. A method according to claim 1, characterized by including a step of checking whether the identified pricing plan includes service identification activation rules.

6. A method according to claim 5, characterized by the said step of provisioning request identification ruling further comprising at least one of the steps of activation of request permissions for certain bearer volume, activation of request permissions for certain service type, and activation of request permission for certain download message or download transaction.

7. A method according to claim 1, characterized by including a step of provisioning the said service identification rules to network elements, if the pricing plan indicates that provisioning is required.

8. A method according to claim 1, characterized by including a step of updating a charging rule within the charging session whenever the pricing plan indicates that the rule should be changed.

9. A method according to claim 1, characterized by the said step of checking a pricing plan for the incoming charging request further comprising at least one of the steps of Checking whether the request is originated by a certain protocol defined in the request identification ruling, checking whether the request includes a specific id or keyword defined in the request identification ruling, checking whether the request is originated by a certain request method defined in the request identification ruling, checking whether the request includes certain header information defined in the request identification ruling, checking whether the request includes certain URL defined in the request identification ruling, and checking whether the request includes some combination of the above said steps.

10. A method according to claim 1, characterized by at least one first network element being a proxy component or proxy application and at least one second network element being a proxy component or application to identify service requests according to different service identification request rules, each proxy component using individual service identification rules.

11. A method according to claim 1, characterized by being performed in a online mediation environment.

12. A method according to claim 1, characterized by combining and managing access, media and service level charging under a pricing plan mechanism which enables the changing of charging rules within an active charging session.

13. A method according to claim 1, characterized by provisioning service identification rules to the network layer control nodes or proxy applications.

14. A method according to claim 1, characterized by a core operating by accepting online charging requests from the controlling nodes.

15. A method according to claim 1, characterized by the communication between core and the control nodes being interactive, providing a request-response method of communicating.

16. A method according to claim 1, characterized by the control nodes requesting permission and authorization for a transaction from the core.

17. A method according to claim 16, characterized by the requesting being request permission for certain bearer volume with certain service type or request permission for certain message or download transaction.

18. A method according to claim 1, characterized by the control nodes performing the initial traffic classification into service types, and performing elementary data aggregation.

19. A method according to claim 18, characterized by using the classification to help to reduce the traffic required between the control nodes and the system.

20. A method according to claim 1, characterized by the information received from control nodes notifying that the user is now roaming.

21. A method according to claim 1, characterized by providing online different protocol adaptations between the different control nodes, and the internal representation of charging transactions.

22. A method according to claim 1, characterized by control node interfaces layer hiding the different control nodes from the core.

23. Means for managing online charging in communications networks, the means comprising:

means for receiving at least one first charging request relating to a service of at least one first charging session in a first network element, means for receiving at least one second charging request relating to a service of at least one charging session in at least one second network element, and means for setting charging model for the first and second charging sessions, characterized by means for operating following means online during an end user session comprising at least one first charging session and at least one second charging session, means for identifying a common user of the at least one first charging session, and the at least one second charging session, means for determining the authorization of the user to the services during the end user session, and for authorized users means for using at least one combination pricing plan for setting charging for the end user session, means for using the combination pricing plan as response to the first and the second received charging requests, means for determining the charging by said combination pricing plan, the charging being different from the charge determined by the first charging request(s) and the second charging request(s) added together, and means for determining being carried through by using during the end user session different proxy components to identify service requests according to different service identification request rules, each proxy component using individual service identification rules.

24. Means according to claim 23, characterized including at least one first network element being a proxy component or proxy application and at least one second network element being a proxy component or application to identify service requests according to different service identification request rules, each proxy component using individual service identification rules.

25. Means according to claim 23, characterized by including means for operating in a online mediation environment.

26. Means according to claim 23 characterized by including means for combining and managing access, media and service level charging under a pricing plan mechanism which enables the changing of charging rules within an active charging session.

27. Means according to claim 23 characterized by including means for provisioning service identification rules to the network layer control nodes or proxy applications.

28. Means according to claim 23, characterized by including means for a core to operate by accepting online charging requests from the controlling nodes.

29. Means according to claim 23, characterized by including the means for interactive communication between core and the control nodes, providing a request-response means for communicating.

30. Means according to claim 23, characterized by including means for the control nodes to request permission and authorization for a transaction from the core.

31. Means according to claim 30, characterized by means for to request permission including means for requesting permission for certain bearer volume with certain service type or request permission for certain message or download transaction.

32. Means according to claim 23, characterized by means for the control nodes to perform the initial traffic classification into service types, and perform elementary data aggregation.

33. Means according to claim 32, characterized by means for using the classification to help to reduce the traffic required between the control nodes and the system.

34. Means according to claim 23, characterized by means for the information received from control nodes notifying that the user is now roaming.

35. Means according to claim 23, characterized by providing means for online different protocol adaptation between the different control nodes, and the internal representation of charging transactions.

36. Means according to claim 23, characterized by means for control node interfaces layer hiding the different control nodes from the core.

37. Means according to claim 23, characterized by including a means for creating charging model in communications network, comprising:
    means for receiving at least one charging request from the network layer including a subscriber identifier, information of whether the user has been authenticated or not, a service identifier referring either access data, service session or a piece of content service, and
    means for checking whether the system includes a pricing plan for the received charging request(s).

38. Means according to claim 37, characterized by including means for checking whether the system withholds an active charging session for the end user in question.

39. Means according to claim 23, characterized by including means for creating a charging session for combining at least two charging requests under a single pricing plan.

40. Means according to claim 23, characterized by including means for checking whether the identified pricing plan includes service identification activation rules.

41. Means according to claim 23, characterized by including means for provisioning the said service identification rules to network elements, if the pricing plan indicates that provisioning is required.

42. Means according to claim 23, characterized by including means for updating a charging rule within the charging session whenever the pricing plan indicates that the rule should be changed.

43. Means according to claim 23, characterized by the means for checking a pricing plan for the incoming charging request further comprising at least one of the following
    means for checking whether the request is originated by a certain protocol defined in the request identification ruling,
    means for checking whether the request includes a specific id or keyword defined in the request identification ruling,
    means for checking whether the request is originated by a certain request method defined in the request identification ruling,
    means for checking whether the request includes certain header information defined in the request identification ruling,
    means for checking whether the request includes certain URL defined in the request identification ruling, and
    means for checking whether the request includes some combination of the above said steps.

44. Means according to claim 23, characterized by including means for creating and maintaining charging session further comprising at least one of the following:
    means for reserving a configurable amount of monetary units for charging according to charging rules, and
    means for withholding a charging rule and updating it according to pricing plan definitions.

45. Means according to claim 23, characterized by including means for the said step of provisioning request identification ruling further comprising at least one of the following:
    means for activating request permissions for certain bearer volume,
    means for activating request permissions for certain service type, and
    means for activating request permission for certain download message or download transaction.

* * * * *